(12) United States Patent
Jones

(10) Patent No.: US 9,897,431 B2
(45) Date of Patent: Feb. 20, 2018

(54) EDGE DETECTOR

(71) Applicant: ROLLS-ROYCE PLC, London (GB)

(72) Inventor: Alan Richard Jones, Derby (GB)

(73) Assignee: ROLLS-ROYCE plc, London (GB)

( * ) Notice: Subject to any disclaimer, the term of this patent is extended or adjusted under 35 U.S.C. 154(b) by 572 days.

(21) Appl. No.: 14/532,384

(22) Filed: Nov. 4, 2014

(65) Prior Publication Data

US 2015/0132108 A1    May 14, 2015

(30) Foreign Application Priority Data

Nov. 12, 2013    (GB) .................................. 1319896.5

(51) Int. Cl.
| | |
|---|---|
| G01B 7/15 | (2006.01) |
| G01B 11/14 | (2006.01) |
| G01B 7/00 | (2006.01) |
| F01D 21/00 | (2006.01) |
| G01B 11/00 | (2006.01) |
| F01D 11/20 | (2006.01) |
| F01D 17/02 | (2006.01) |
| G01H 1/00 | (2006.01) |

(52) U.S. Cl.
CPC .............. *G01B 7/003* (2013.01); *F01D 11/20* (2013.01); *F01D 17/02* (2013.01); *F01D 21/003* (2013.01); *G01B 11/002* (2013.01); *G01H 1/006* (2013.01)

(58) Field of Classification Search
CPC ........ G01B 7/003; G01B 7/15; G01B 11/002; G01B 11/14; F01D 11/20; F01D 17/02; F01D 21/003; G01H 1/006; G01H 9/00; G01H 9/044; G01H 9/006

USPC ........................................... 73/660, 655, 657
See application file for complete search history.

(56) References Cited

U.S. PATENT DOCUMENTS

| | | | | |
|---|---|---|---|---|
| 4,934,192 | A | * | 6/1990 | Jenkins ................... G01H 11/02 73/660 |
| 5,082,421 | A | * | 1/1992 | Acton ...................... F01D 17/02 415/118 |
| 5,206,816 | A | * | 4/1993 | Hill ......................... G01H 1/006 702/56 |
| 5,511,426 | A | * | 4/1996 | Clement ................. G01B 11/16 73/655 |
| 7,762,153 | B2 | | 7/2010 | Hoyte et al. |
| 2010/0074727 | A1 | * | 3/2010 | Twerdochlib .......... G01H 1/006 415/118 |
| 2010/0076703 | A1 | | 3/2010 | Twerdochlib |

OTHER PUBLICATIONS

Search Report issued in United Kingdom Application No. GB1319896.5 dated May 12, 2014.

\* cited by examiner

*Primary Examiner* — Hezron E Williams
*Assistant Examiner* — Rose M Miller
(74) *Attorney, Agent, or Firm* — Oliff PLC

(57) ABSTRACT

An edge detector is provided for determining the axial position of the leading or trailing edge of a rotating blade within rotating machinery. The edge detector includes a set of axially spaced tip detection probes locatable within a casing of the machinery. Each probe is arranged to detect whether or not the blade tip passes over that probe. The edge detector determines the axial position of the edge of the blade as the position of the boundary between those tip detection probes which detect passage of the blade tip thereover and those tip detection probes which detect no passage of the blade tip thereover.

15 Claims, 4 Drawing Sheets

Section AA

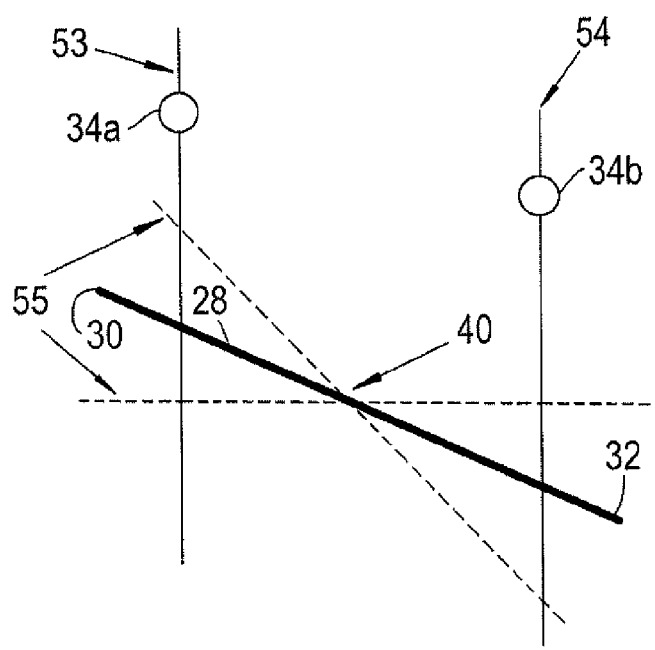
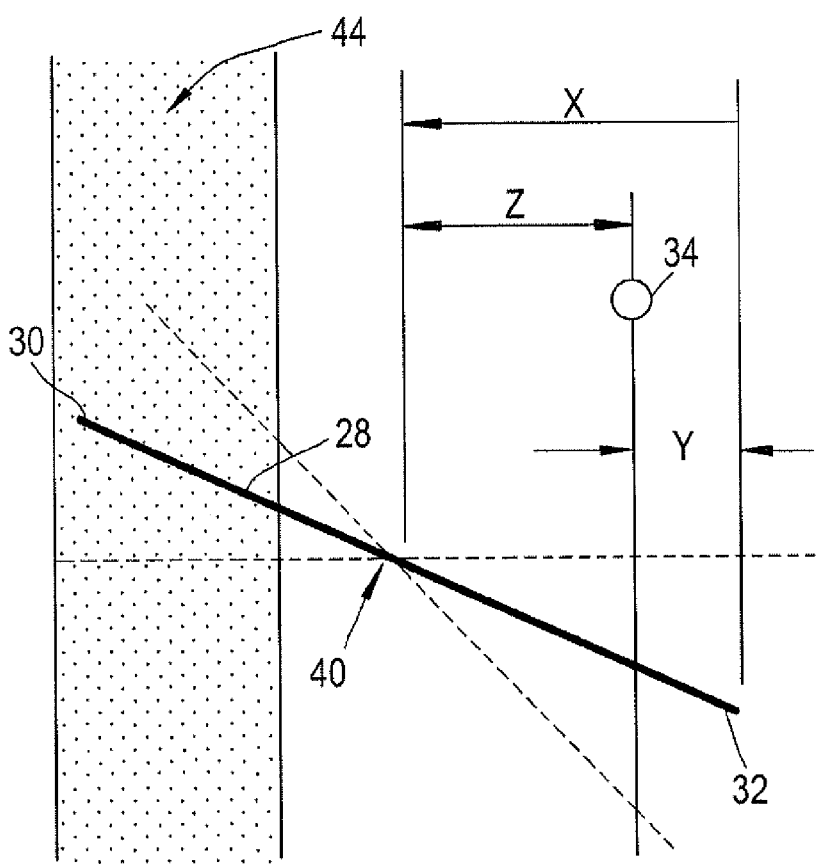

EDGE DETECTOR

FIELD OF THE INVENTION

The present invention relates to an edge detector for determining the axial position of the leading or trailing edge of a rotating blade within rotating machinery, such as a gas turbine engine.

BACKGROUND OF THE INVENTION

In the development of gas turbine engines, it is often important to determine the amount of vibration of the rotating blades. From vibration measurements, stresses induced in the blades may be determined. Action can then be taken to avoid stresses which are high enough to cause damage to the blades.

It is known, for example, to mount strain gauges on rotating compressor/turbine blades to provide information about the amplitudes and frequencies of vibration of the blades. One or more strain gauges can be provided on each blade, and connected to a radio telemetry system mounted on the rotor, which transmits the measurements from the rotor. However, due to the number of strain gauges required to fully determine the vibrations, the telemetry system is typically complex, expensive, large and time-consuming to install within the rotor.

An alternative technique for characterising blade vibration is "blade tip timing" (BTT) in which non-contact timing probes, typically mounted on the engine casing, are used to measure the time at which a blade passes each probe. This time is compared with the time at which the blade would have passed the probe had it not been vibrating. This is termed the "expected arrival time" and can be calculated from the rotational position of the particular blade on the rotor in conjunction with a "once per revolution" or "OPR" signal which provides information about the position of the rotor. The OPR signal is derived from the time at which an indicator on the rotor passes a reference sensor, and its use is well known in the art.

The difference between the expected arrival time and the actual arrival time can be multiplied by the blade tip velocity to give the displacement of the blade from its expected position. Thus BTT data from a particular probe effectively measures blade tip displacement at the probe.

Typically, sets of BTT probes are located at both the leading and trailing edges of the blade. The relative axial position of the blade compared to the probes changes between the cold condition, in which the engine is built, and the hot running conditions. For this reason, during installation a margin is generally allowed between a set of BTT probes and the respective blade edge. This margin should be minimised to obtain the best quality data, but without risking the blade moving completely away from the probes such that their signals are lost.

It is sometimes the case, however, that a given casing design allows a set of BTT probes to be installed at only one of the blade edges. As a consequence, the quality of the analysis that can be performed using the BTT data is reduced because less is known about the precise location of the blade.

SUMMARY OF THE INVENTION

Accordingly, a first aspect of the present invention provides an edge detector for determining the axial position of the leading or trailing edge of a rotating blade within rotating machinery, the edge detector including:
a set of axially spaced tip detection probes locatable within a casing of the machinery, each probe being arranged to detect whether or not the blade tip passes over that probe;
wherein the edge detector determines the axial position of the edge of the blade as the position of the boundary between those tip detection probes which detect passage of the blade tip thereover and those tip detection probes which detect no passage of the blade tip thereover.

Advantageously, the axial position determined by the edge detector can be used to improve the quality of BTT analyses. As the detection probes detect either the presence or absence of a passing blade, calibration uncertainty involved with measuring distance from a given probe to the respective edge can be reduced or eliminated, improving the accuracy with which the axial position can be determined. Conveniently, the probes may be of the same type as the probes that are conventionally used to perform BTT. However, in this case the probes are used to detect leading or trailing edge axial position rather than collect timing data.

The edge detector of the first aspect may have a processor unit (which may be an element of a computer or computer system, or an element of an engine electronic controller) which determines the axial position of the edge of the blade as the position of the boundary between those tip detection probes which detect passage of the blade tip thereover and those tip detection probes which detect no passage of the blade tip thereover.

A second aspect of the present invention provides a blade tip timing apparatus having:
the edge detector of the first aspect for determining the axial position of the leading or trailing edge of a rotating blade;
a row of blade tip timing probes locatable within the casing to measure the times at which a position on the tip of the blade passes the blade tip timing probes; and
a processor unit (which may be an element of a computer or computer system, or an element of an engine electronic controller) which receives axial position and timing data from respectively the edge detector and the blade tip timing probes, and calculates therefrom the vibration of the blade (e.g. calculates a frequency and/or amplitude of blade vibration).

Thus the edge detector allows accurate measurement of the vibration of the blade to be made even when BTT probes can be located at only one of the leading or trailing edges of the blade, e.g. due to the design of the casing in the relevant area at the other edge. Accordingly, the blade tip timing probes of the second aspect may be adjacent the edge of the blade whose axial position is detected by the edge detector. In this way the tip detection probes and the blade tip timing probes can all be at one edge. However, this does not exclude that in other arrangements, the blade tip timing probes of the second aspect may be adjacent e.g. the edge of the blade opposite to the edge whose axial position is detected by the edge detector.

The processor unit of the second aspect may use the axial position determined by the edge detector to calculate the axial distance Z of the axis of torsional vibration of the blade from the axial position of the blade tip timing probes. The processor unit can then calculate the vibration of the blade from this axial distance and the timing data. For example, the processor unit may employ a torsional vibration model or results of an experimental vibration test, e.g. to calculate or otherwise determine the axial distance X of the axis of torsional vibration from the leading or trailing edge. It can then calculate Z by subtracting from X the axial distance Y between the leading or trailing edge and the blade tip timing probes, Y being determined by the axial position data from the edge detector.

A third aspect of the present invention provides a rotating machinery casing fitted with the edge detector of the first aspect or the blade tip timing apparatus of the second aspect.

A fourth aspect of the present invention provides rotating machinery having the casing of the third aspect.

Optional features of the invention will now be set out. These are applicable singly or in any combination with any aspect of the invention.

There may be at least three, four, five, six or seven tip detection probes in the set of axially spaced tip detection probes of the edge detector.

This edge detector may have its probes axially spaced at equal intervals. This allows the axial position of the edge to be determined with a precision equal to the length of the interval. Smaller or larger axial spacings can be used as appropriate depending on, e.g. the size of the blades, the number of probes, and the predicted range of relative axial movement between blade and casing.

The edge detector may have its probes spaced circumferentially in a helical arrangement. The circumferential spacing can be regular or irregular to suit existing features of the casing.

The probes of the edge detector may be optical or capacitance probes.

The rotating machinery may be a gas turbine engine, such as an industrial or aerospace gas turbine engine. In particular, the edge detector may be used in respect of fan, compressor or turbine blades. It may also be used in respect of propellors of an aeroengine having ducted propellors. In another application, the rotating machinery may be a pump, the edge detector being used in respect of pump vanes.

BRIEF DESCRIPTION OF THE DRAWINGS

Embodiments of the invention will now be described by way of example with reference to the accompanying drawings in which:

FIG. 5 shows schematically a view onto the tip of a blade having both leading edge and trailing edge BTT probes; and FIG. 6 shows schematically a view onto the tip of a blade having just trailing edge BTT probes.

DETAILED DESCRIPTION AND FURTHER OPTIONAL FEATURES OF THE INVENTION

Figure 1:
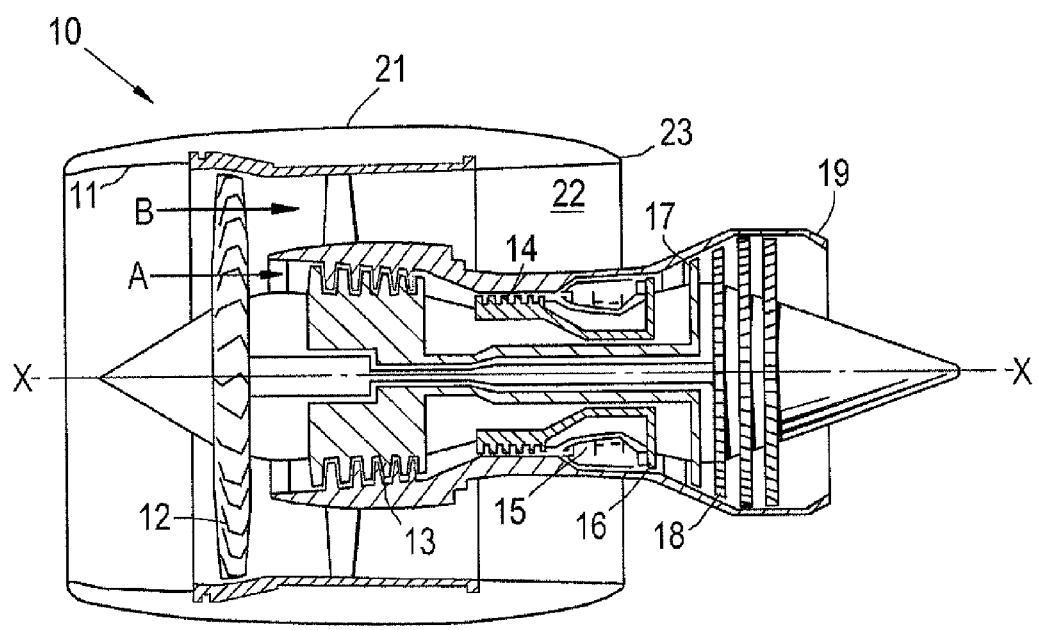
FIG. 1 shows a longitudinal cross section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2A:
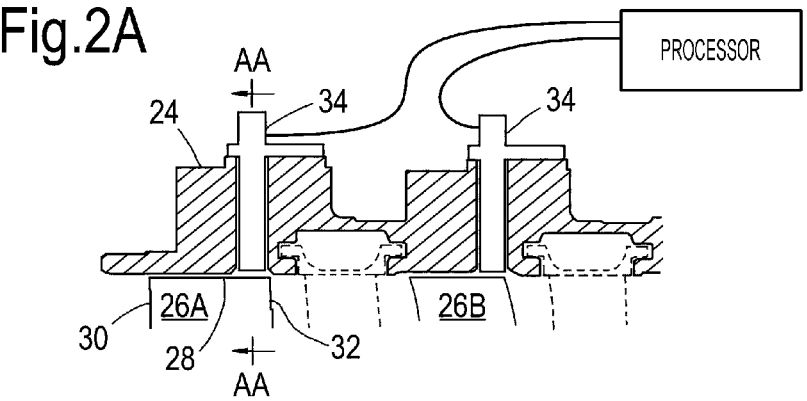
FIG. 2A shows a longitudinal cross sectional view of a portion of the compressor casing of the engine.

FIG. 2A shows a longitudinal cross sectional view of a portion of the compressor casing 24 of the engine. The casing encloses a circumferential row of blades 26A, each blade having a tip 28, a leading edge 30, and a trailing edge 32. A circumferential distributed array of BTT probes 34 are carried by the casing adjacent the trailing edges of the blades. A second row of BTT probes 34 are carried by the casing adjacent the trailing edges of a next row of blades 26B.

Figure 2B:
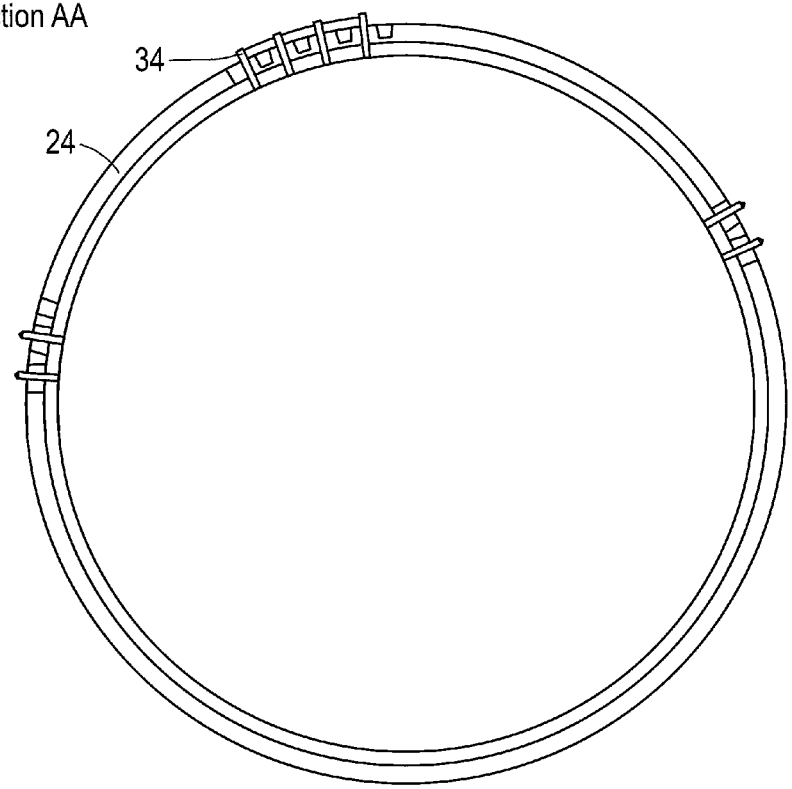
FIG. 2B shows a view, looking along the rotor axis, of section AA-AA of FIG. 2A.

FIG. 2B shows a view, looking along the rotor axis, of section AA-AA of FIG. 2A. The BTT probes 34 of the circumferential distributed array are formed into three groups, and are all directed radially toward the centre of the engine.

Due to space and casing constraints, each row of blades 26A, 26B has only one array of BTT probes 34 (in this case at the trailing edges of the blades). To improve the accuracy of the measurements made by these probes, the present invention provides an edge detector, which allows the position of the respective edge relative to the probes to be precisely located.

Figure 3:
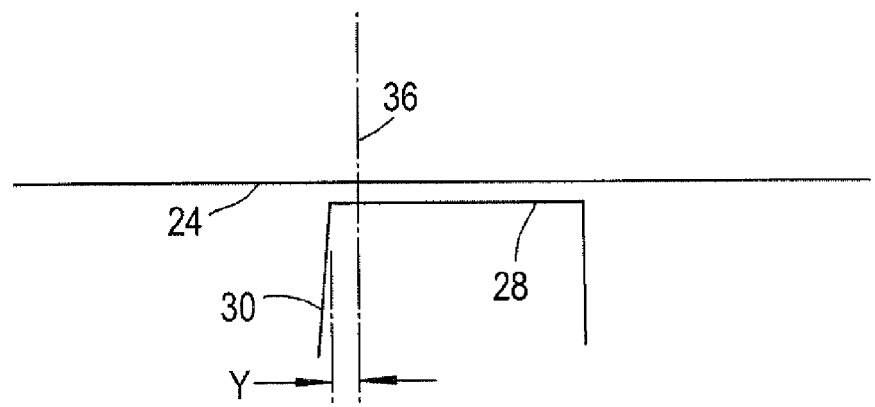
FIG. 3 shows schematically a side view of a blade.

More particularly, FIG. 3 shows schematically a side view of a blade (such as a fan blade, compressor blade or turbine blade) having a leading edge 30 and a tip 28. The centre line 36 of a BTT probe passes through the blade close to the leading edge. The distance Y between the centre line and the leading edge at the tip is the same for all the BTT probes of the respective array. Although build tolerances and changes caused by variation in operating conditions can cause variation in Y, it can nonetheless be determined using the edge detector.

Figure 4:
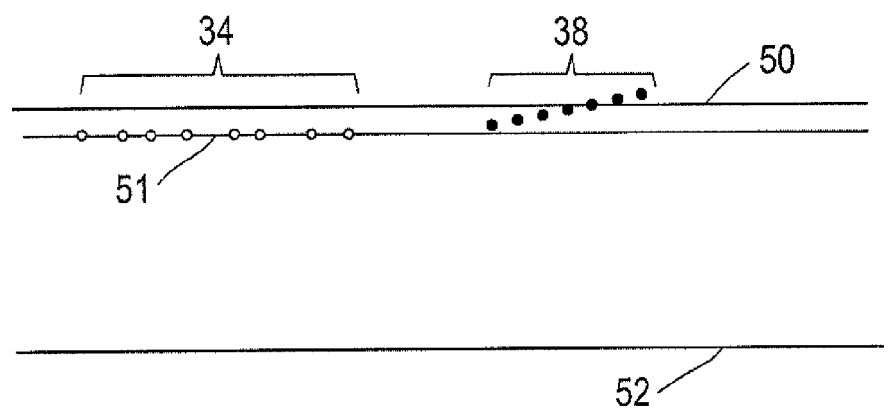
FIG. 4 shows schematically the positions of BTT probes and tip detection probes relative to the path swept out by the tip of the blade of FIG. 3.

The edge detector provides a set of tip detection probes 38 (which like the BTT probes may be radially-directed optical probes or capacitance probes) arranged in the casing such that each probe in the set is at a different axial position. FIG. 4 shows schematically the positions of the BTT probes 34 and the tip detection probes 38 relative to the path swept out by the tip 28 of the blade of FIG. 3. In this example edge detector has seven tip detection probes. Under running conditions, the distance $y_1$ of the closest tip detection probe to the leading edge 30 may equal 1 mm; for the second probe $y_2$=0.75 mm; likewise $y_3$=0.50 mm; $y_4$=0.25 mm; $y_5$=0 mm; $y_6$=−0.25 mm and $y_7$=−0.50 (a positive value of y indicating that the respective probe is behind the leading edge, and a negative value of y indicating that the respective probe is in front of the leading edge). Tip detection probes behind the leading edge signal the passage of the tip thereover, while probes in front of the leading edge obtain no signal from the blade tip. Detection of the axial position of the leading edge thus occurs by defining the edge of the blade as being at the boundary between those tip detection probes which produce a signal and those which produce no signal. With the tip detection probes being equally axially spaced 0.25 mm apart, and with the axial positions of the tip detection probes relative to the plane of the BTT probes being known, this therefore permits the determination of the axial position Y of the leading edge relative to the plane of the BTT probes to the nearest 0.25 mm. In the example of FIG. 4, the first five tip detection probes closest to the plane of the BTT probes detect the passing of the blade tip, but the sixth and seventh do not, locating the leading edge with a precision of 0.25 mm between the fifth and sixth probes.

Smaller or larger axial spacings between the tip detection probes 38 may be used as appropriate for the size of the blades, the number of tip detection probes in a set and the predicted range of relative axial movement between blade and casing.

Typically, the tip detection probes 38 are also circumferentially spaced apart, producing the helical arrangement of probes shown in FIG. 4. The circumferential spacing allows a tighter axial spacing to be adopted. However, the probes may be distributed circumferentially in a less regular manner than shown in FIG. 4, e.g. to accommodate existing features of the casing. The edge detector may have more than one set of axially spaced tip detection probes to provide redundancy in case any individual probe becomes inoperable.

FIG. 5 shows schematically a view onto the tip 28 (represented as a thick solid line) of a blade having both leading edge 34a and trailing edge 34b BTT probes. Dashed lines show possible displaced positions of the blade tip as a result of torsional mode vibrations about a torsion axis 40. Monitoring these vibrations is one of the reasons that BTT is used in gas turbine engines. In FIG. 5, both edges of the blade tip are accessible at the casing so respective rows of BTT probes 34a, 34b can be placed at the leading and trailing edges. Uncertainty in the distance between the centre of rotation (i.e. the torsion axis 40) and the plane of one of the rows of BTT probes can be prevented from propagating to uncertainty in the calculated torsional vibration displacement of the blade by correlating the data from that plane with the data from the BTT probes of the other plane.

FIG. 6 shows schematically a view onto the tip 28 of a blade having just trailing edge BTT probes 34, a casing flange 44 preventing probes from being installed over the leading edge. In this, case uncertainty in the distance Z between the centre of rotation about the torsion axis 40 and the plane of the BTT probes can be prevented from propagating to uncertainty in the calculated torsional vibration displacement of the blade by correlating the data from the BTT probes with the data from an edge detector have a set of tip detection probes which determine the axial position Y of the trailing edge relative to the plane of the BTT probes. In particular, the axial distance X between the torsion axis and the trailing edge can be calculated using a model, such as a finite element model, in a manner known to the skilled person. Another option, however, is to calculate the axial distance X from results of an experimental vibration test, e.g. carried out on a static component in a rig. In any event, by subtracting Y from X, the value of Z is obtained.

The calculation of the distance Z and subsequent BTT vibration analysis can be performed on- or off-line by a suitably programmed computer system. Another option is to incorporate these calculations into an on-board health monitor, which may part of the engine electronic controller.

Another use for leading or trailing edge detection is in the validation of the axial pitching configuration of the compressor. For example, the axial pitching configuration should ensure that differential thermo-mechanical displacements and surge deflections between rotor and stator do not cause contact to occur between rotating and static components.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An edge detector for determining an axial position of a leading or trailing edge of a rotating blade within rotating machinery along a longitudinal axis of the rotating machinery, the edge detector including:
a set of axially spaced tip detection probes locatable within a casing of the machinery, each probe being arranged to detect whether or not a blade tip passes over that probe;
wherein:
the edge detector determines an axial position of an edge of the blade as a position of a boundary between the tip detection probes that detect passage of the blade tip and the tip detection probes that detect no passage of the blade tip; and
the tip detection probes are spaced circumferentially in a helical arrangement.

2. The edge detector of claim 1, wherein the tip detection probes are axially spaced at equal intervals.

3. The edge detector of claim 2 where the tip detection probes are optical probes.

4. The edge detector of claim 2 wherein the tip detection probes are capacitance probes.

5. The edge detector of claim 1 where the tip detection probes are optical probes.

6. The edge detector of claim 1 wherein the tip detection probes are capacitance probes.

7. The edge detector of claim 1, having two or more circumferentially spaced sets of the axially spaced tip detection probes.

8. A blade tip timing apparatus having:
the edge detector of claim 1 for determining the axial position of the leading or trailing edge of the rotating blade;
a row of blade tip timing probes locatable within the casing to measure the times at which a position on the tip of the blade passes the blade tip timing probes;
a processor unit configured to receive axial position and timing data from respectively the edge detector and the blade tip timing probes, and configured to calculate a vibration of the blade.

9. The blade tip timing apparatus of claim 8, wherein the blade tip timing probes are adjacent to the edge of the blade having an axial position that is detected by the edge detector.

10. A blade tip timing apparatus having:
an edge detector for determining an axial position of a leading or trailing edge of a rotating blade within rotating machinery along a longitudinal axis of the rotating machinery, the edge detector including a set of axially spaced tip detection probes locatable within a casing of the machinery, each probe being arranged to detect whether or not a blade tip passes over that probe;

a row of blade tip timing probes locatable within the casing to measure the times at which a position on the tip of the blade passes the blade tip timing probes;

a processor unit configured to receive axial position and timing data from respectively the edge detector and the blade tip timing probes, and configured to calculate a vibration of the blade, wherein:

the edge detector determines an axial position of an edge of the blade as a position of a boundary between the tip detection probes that detect passage of the blade tip and the tip detection probes that detect no passage of the blade tip;

the processor unit employs a torsional vibration model and an axial position data to calculate an axial distance of an axis of torsional vibration of the blade from the blade tip timing probes, preliminary to calculating the vibration of the blade from timing data.

11. A blade tip timing apparatus having:

an edge detector for determining an axial position of a leading or trailing edge of a rotating blade within rotating machinery along a longitudinal axis of the rotating machinery, the edge detector including a set of axially spaced tip detection probes locatable within a casing of the machinery, each probe being arranged to detect whether or not a blade tip passes over that probe;

a row of blade tip timing probes locatable within the casing to measure the times at which a position on the tip of the blade passes the blade tip timing probes;

a processor unit configured to receive axial position and timing data from respectively the edge detector and the blade tip timing probes, and configured to calculate a vibration of the blade, wherein:

the edge detector determines an axial position of an edge of the blade as a position of a boundary between the tip detection probes that detect passage of the blade tip and the tip detection probes that detect no passage of the blade tip;

the processor unit employs results of an experimental vibration test to determine the axial distance of the axis of torsional vibration of the blade from the blade tip timing probes, preliminary to calculating the vibration of the blade from the timing data.

12. A rotating machinery casing fitted with an edge detector, the edge detector including:

a set of axially spaced tip detection probes locatable within a casing of the machinery along a longitudinal axis of the machinery, each probe being arranged to detect whether or not a blade tip passes over one of the probes;

wherein:

the edge detector determines an axial position of an edge of a blade as a position of a boundary between the tip detection probes that detect passage of the blade tip and the tip detection probes that detect no passage of the blade tip; and the tip detection probes are spaced circumferentially in a helical arrangement.

13. A rotating machinery casing according to claim 12, wherein the tip detection probes are axially spaced at equal intervals.

14. A rotating machinery casing according to claim 12 having two or more circumferentially spaced sets of the axially spaced tip detection probes.

15. Rotating machinery having the rotating machinery casing of claim 12.

* * * * *